US012785428B2

(12) United States Patent
Dou et al.

(10) Patent No.: US 12,785,428 B2
(45) Date of Patent: Nov. 3, 2026

(54) CHARGING BASE FOR A CHARGING GUN

(71) Applicants: Tyco Electronics (Suzhou) Ltd., Suzhou City (CN); Tyco Electronics Technology (SIP) Ltd., Suzhou (CN); Tyco Electronics (Shanghai) Co., Ltd., Shanghai (CN)

(72) Inventors: Renyi (Ronny) Dou, Suzhou (CN); Jinshun (Jet) Wang, Suzhou (CN); Fangyue (Jason) Zhu, Shanghai (CN); Haomai (Ivan) Yin, Shanghai (CN)

(73) Assignees: Tyco Electronics (Shanghai) Co., Ltd., Shanghai (CN); Tyco Electronics Technology (SIP) Ltd., Suzhou (CN); Tyco Electronics (Suzhou) Ltd., Suzhou (CN)

( * ) Notice: Subject to any disclaimer, the term of this patent is extended or adjusted under 35 U.S.C. 154(b) by 943 days.

(21) Appl. No.: 18/100,980

(22) Filed: Jan. 24, 2023

(65) Prior Publication Data

US 2023/0238811 A1 Jul. 27, 2023

(30) Foreign Application Priority Data

Jan. 24, 2022 (CN) ......................... 202220192054.2
Aug. 19, 2022 (CN) ......................... 202222191750.4

(51) Int. Cl.
*H02J 7/70* (2026.01)

(52) U.S. Cl.
CPC .................................... *H02J 7/751* (2026.01)

(58) Field of Classification Search
CPC ............................ Y02T 10/70; Y02T 10/7072
See application file for complete search history.

(56) References Cited

U.S. PATENT DOCUMENTS

| | | | | |
|---|---|---|---|---|
| 9,461,399 | B2 * | 10/2016 | Seelig | H01R 13/506 |
| 9,531,100 | B2 * | 12/2016 | Fukushima | H01R 13/08 |
| 9,758,046 | B2 * | 9/2017 | Harper | B60L 53/64 |
| 10,756,498 | B1 * | 8/2020 | Sarraf | B60L 53/16 |
| 11,904,715 | B2 * | 2/2024 | Erikson | B60L 53/16 |
| 2010/0317212 | A1 * | 12/2010 | Daily | F21K 9/27 439/230 |
| 2015/0343914 | A1 * | 12/2015 | Osawa | B60L 53/16 439/205 |
| 2016/0144728 | A1 * | 5/2016 | Harper | B60L 53/67 320/109 |

(Continued)

FOREIGN PATENT DOCUMENTS

WO WO-2014077196 A1 * 5/2014 ............. H01R 13/08

*Primary Examiner* — Abdullah A Riyami
*Assistant Examiner* — Thang H Nguyen
(74) *Attorney, Agent, or Firm* — Barley Snyder

(57) ABSTRACT

A charging base comprises a charging end assembly and a connecting end assembly detachably connected thereto. The charging end assembly includes a charging end housing defining a plurality of first openings, and a plurality of front terminals detachably fixed in respective ones of the first openings. The connecting end assembly includes a connecting end housing defining a plurality of second openings, and a plurality of rear terminals detachably fixed in respective ones of one of the plurality of second openings. The front and rear terminals being detachably electrically connected to one another with the connecting end assembly connected to the charging end assembly.

18 Claims, 24 Drawing Sheets

(56) References Cited

U.S. PATENT DOCUMENTS

| | | | | |
|---|---|---|---|---|
| 2022/0102898 | A1* | 3/2022 | Dou | B60L 53/16 |
| 2022/0131308 | A1* | 4/2022 | Lin | H01R 31/06 |
| 2022/0371457 | A1* | 11/2022 | Park | B60L 53/16 |

* cited by examiner

C-C

CHARGING BASE FOR A CHARGING GUN

CROSS-REFERENCE TO RELATED APPLICATIONS

This application claims the benefit of Chinese Patent Application No. CN202220192054.2 filed on Jan. 24, 2022 and Chinese Patent Application No. CN202222191750.4 filed on Aug. 19, 2022 in the State Intellectual Property Office of China, the whole disclosures of which are incorporated herein by reference.

FIELD OF THE INVENTION

The present disclosure relates to a charging base, in particular to a charging base for use with a charging gun.

BACKGROUND

The front ends of various terminals, including power terminals and signal terminals, in the charging base are used for matching with the matching terminals on the charging gun, while the rear ends of various terminals are used for connecting with cables. In the prior art, various terminals in the charging base are not easily replaced, and are therefore unsuitable for use in applications subject to high wear.

SUMMARY

According to an embodiment of the present disclosure, a charging base comprises a charging end assembly and a connecting end assembly detachably connected thereto. The charging end assembly includes a charging end housing defining a plurality of first openings, and a plurality of front terminals detachably fixed in respective ones of the first openings. The connecting end assembly includes a connecting end housing defining a plurality of second openings, and a plurality of rear terminals detachably fixed in respective ones of one of the plurality of second openings. The front and rear terminals being detachably electrically connected to one another with the connecting end assembly connected to the charging end assembly.

BRIEF DESCRIPTION OF THE DRAWINGS

The invention will now be described by way of example with reference to the accompanying Figures, of which.

DETAILED DESCRIPTION OF THE EMBODIMENTS

Figure 1A:
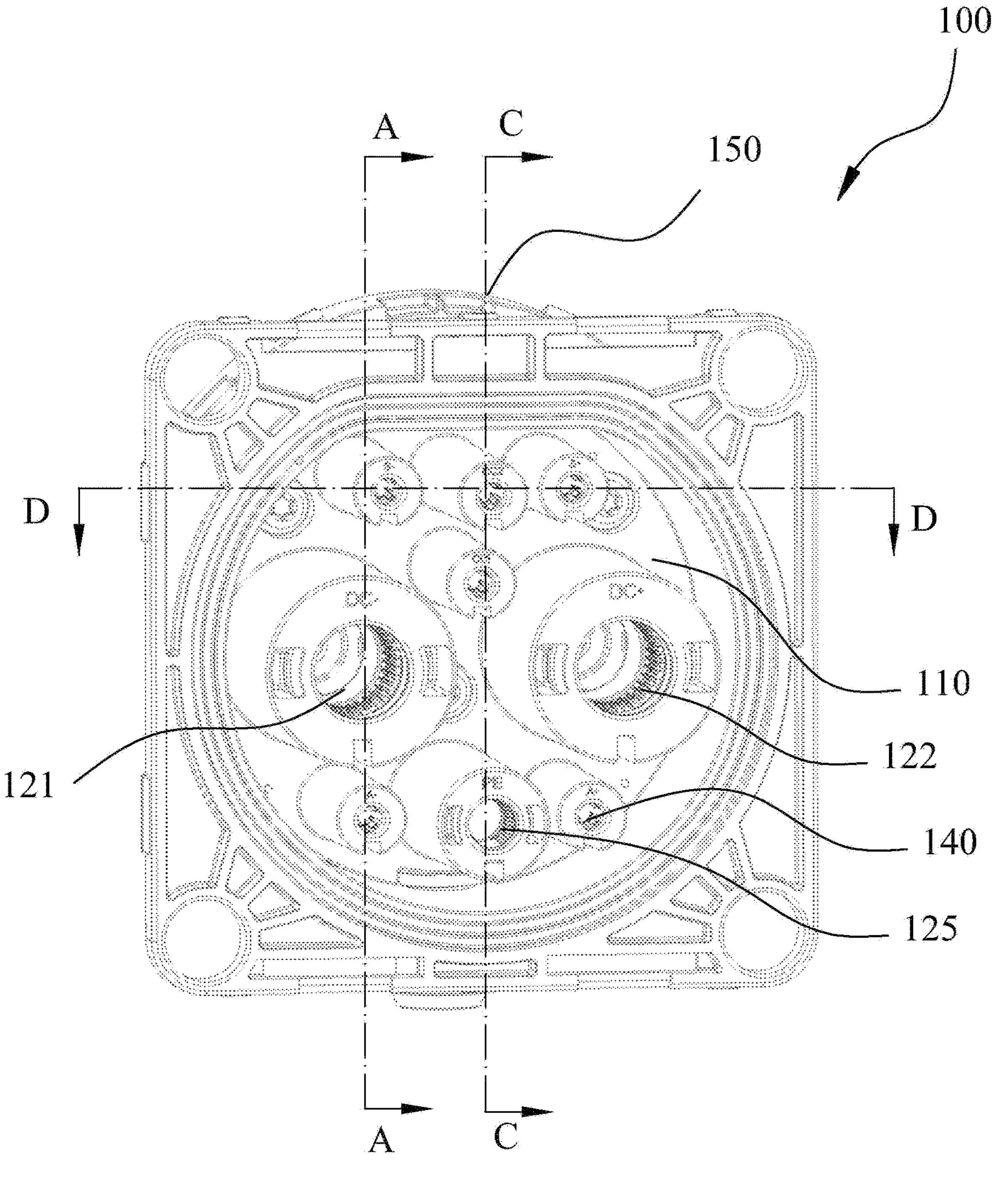
FIG. 1A is a perspective view of a charging base according to an embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a charging base includes charging end assembly having a charging end housing and a plurality of front power terminals. The charging end housing is provided with a plurality of first holes, and each of the front power terminals is fixedly arranged in one of the plurality of first holes. A connecting end assembly of the charging base includes a connecting end housing and a plurality of rear power terminals. The connecting end housing is provided with a plurality of second holes, and each of the rear power terminals is arranged in one of the plurality of second holes. The charging end assembly is detachably connected to the connecting end assembly. When the charging end assembly is connected to the connecting end assembly, the second holes are respectively aligned and communicating with the first holes, and the rear power terminals are respectively connected to the front power terminals. When the charging end assembly is removed from the connecting end assembly, the front power terminals remain in the charging end housing and are separated from the connecting end assembly together with the charging end housing.

Figure 1B:
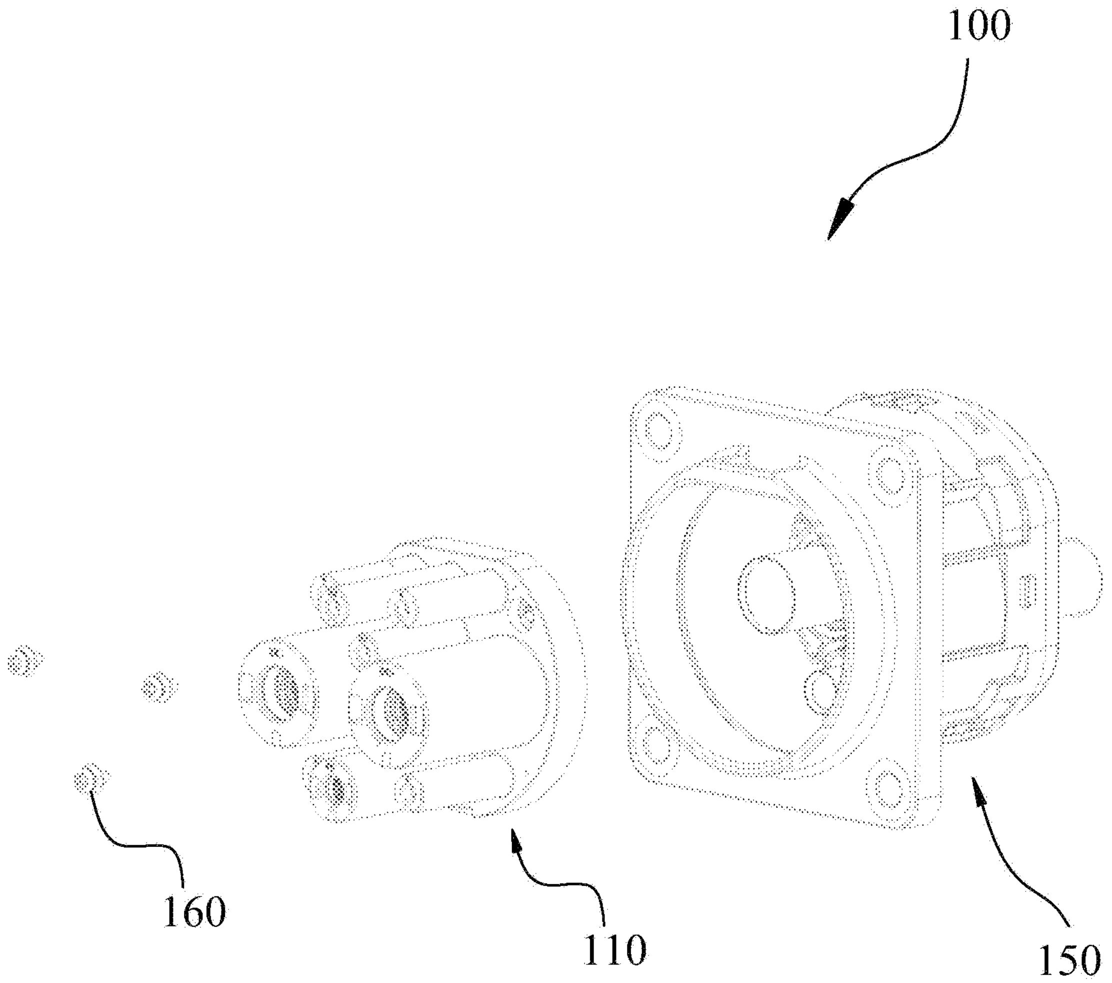
FIG. 1B is a partial exploded view of the charging base shown in FIG. 1A.

FIGS. 1A and 1B illustrate the overall structure of the charging base 100 according to an embodiment of the present invention, wherein FIG. 1A is a perspective view of the charging base 100, and FIG. 1B is a partial exploded view of the charging base 100. As shown, the charging base 100 comprises a charging end assembly 110 for matching with the charging gun and a connecting end assembly 150 for connecting with the cable. The charging end assembly 110 and the connecting end assembly 150 are connected to each other to form the charging base 100. The charging end assembly 110 is detachably connected to the connecting end assembly 150. In the embodiments shown in FIGS. 1A and 1B, the detachable connection between the charging end assembly 110 and the connecting end assembly 150 is realized by the plurality of fasteners 160.

The charging base 100 comprises a plurality of power terminals and a plurality of signal terminals 140. In the embodiment shown in the figure, the plurality of power terminals include three power terminals, namely, the positive terminal 121, the negative terminal 122 and the ground terminal 125. The structures of these terminals are generally similar. The plurality of signal terminals 140 comprises five signal terminals whose structures are generally similar. The front ends of the power terminal and signal terminal are used to connect with the charging gun, and the rear ends are used to connect with cables.

Figure 2A:
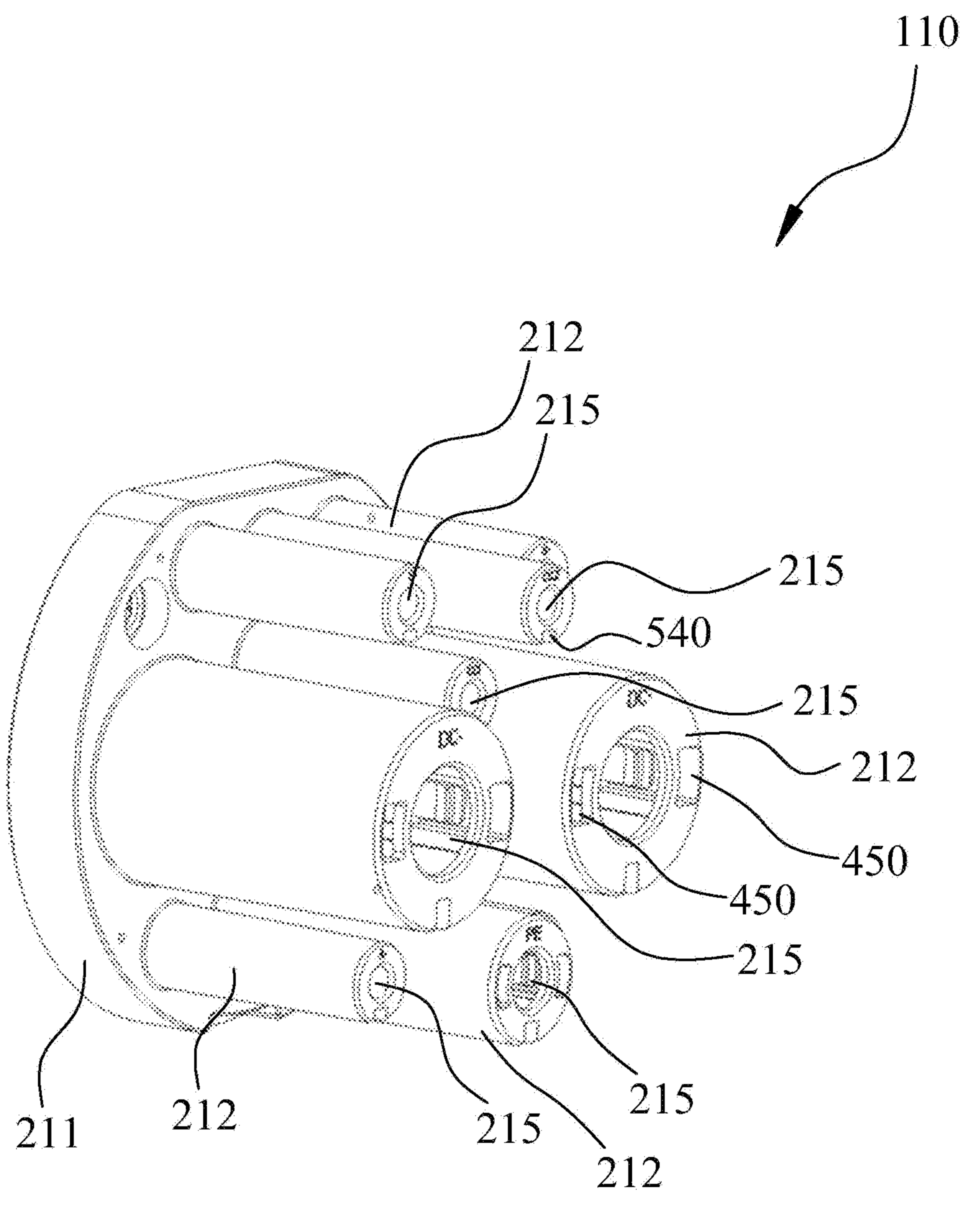
FIG. 2A is a perspective view of the charging end assembly in FIG. 1A.
Figure 2B:
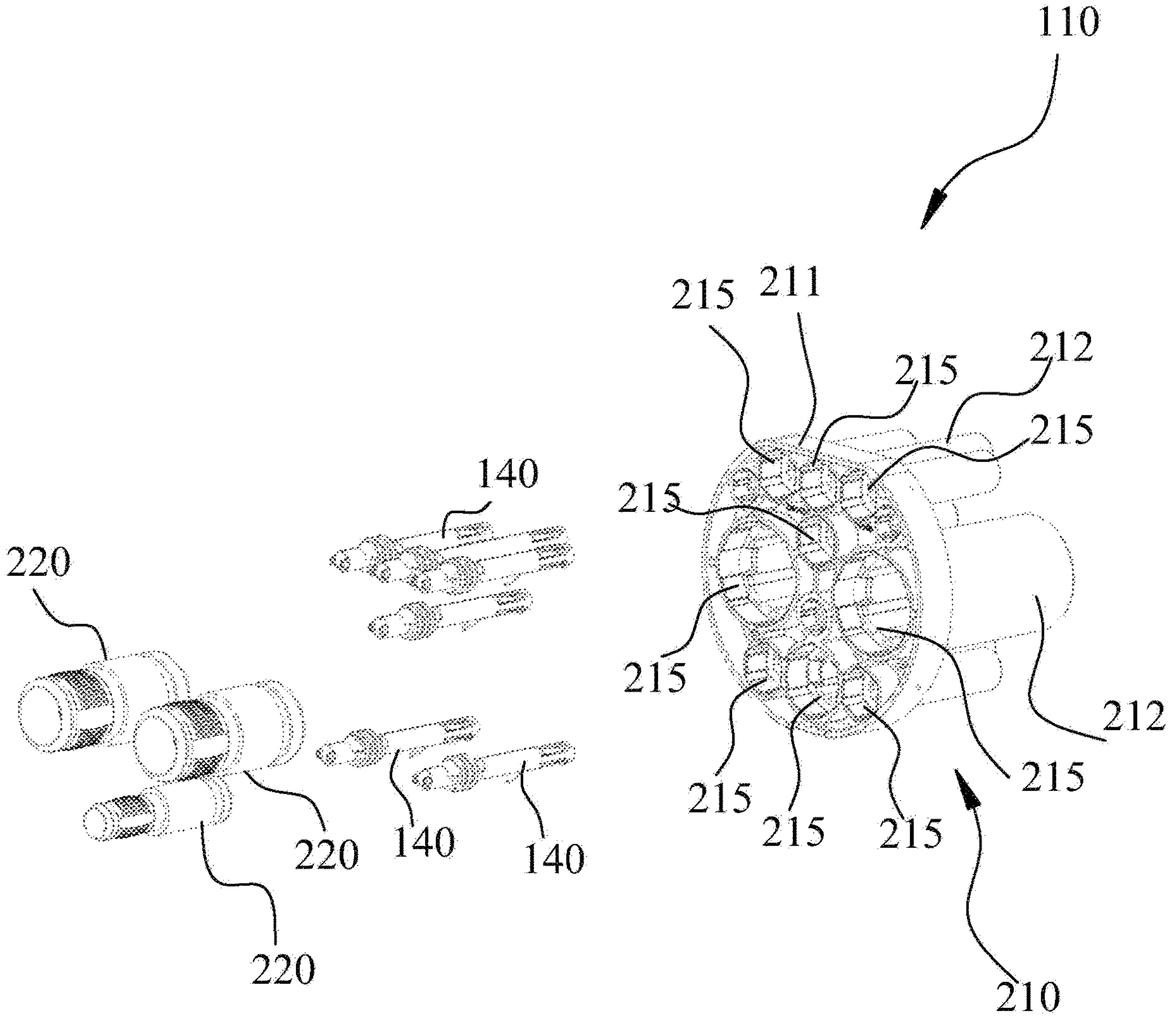
FIG. 2B is an exploded view of the charging end assembly in FIG. 2A.
Figure 3A:
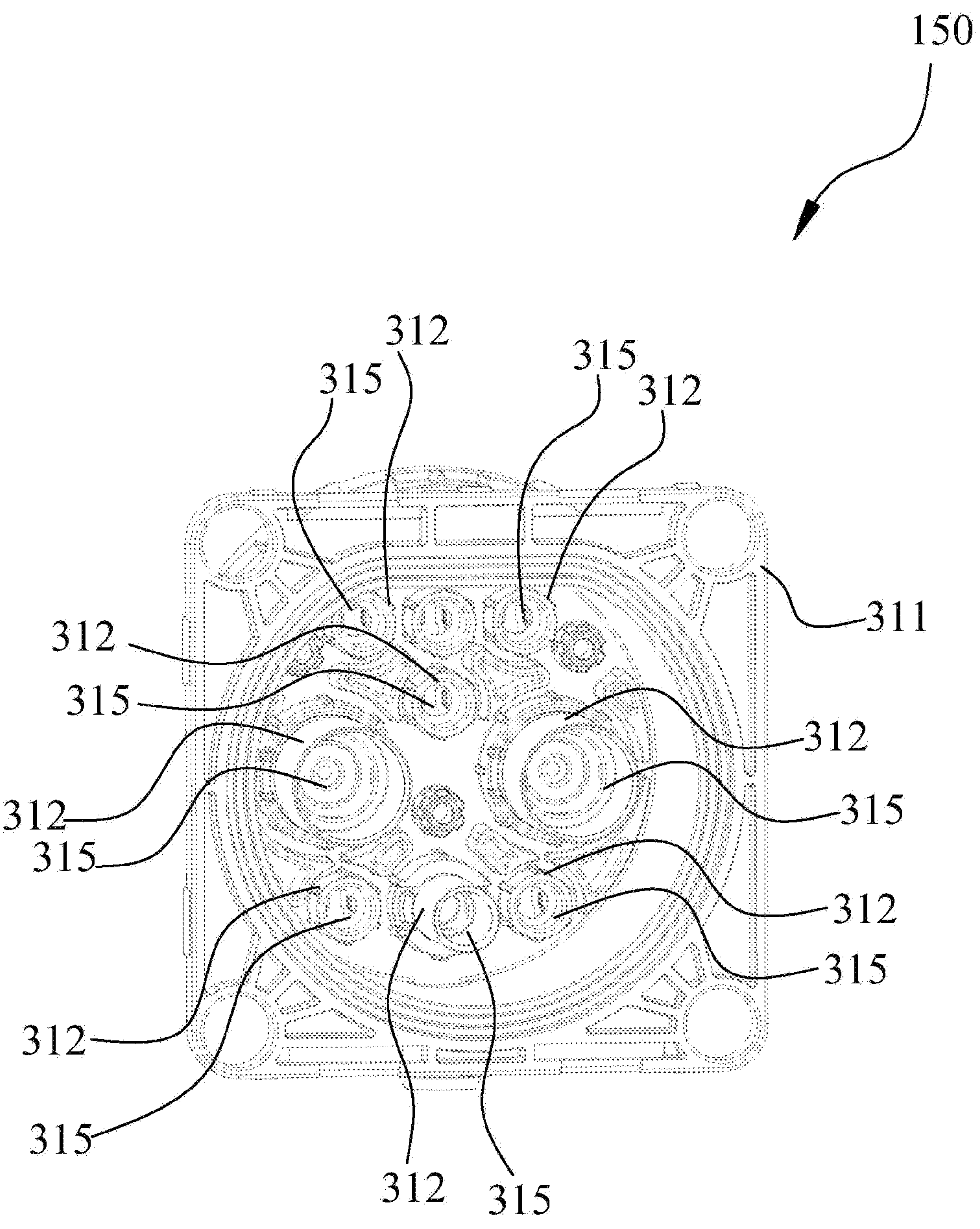
FIG. 3A is a perspective view of the connecting end assembly in FIG. 1A.
Figure 3B:
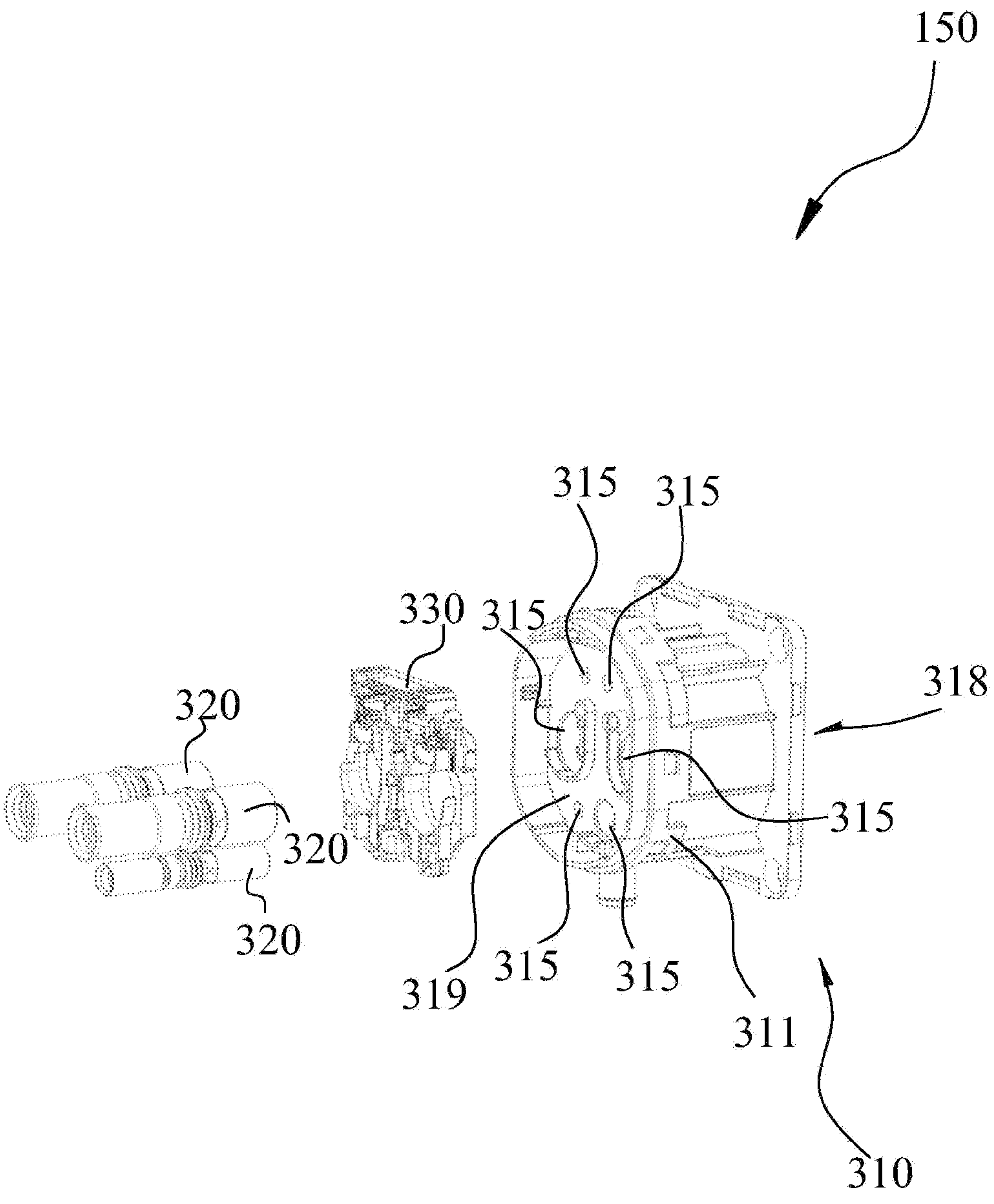
FIG. 3B is an exploded view of the connecting end assembly in FIG. 1A.

According to the present invention, each power terminal (i.e., each of the positive terminal 121, negative terminal 122 and ground terminal 125) is divided into two parts that can be matched and connected together, namely, the front power terminal 220 (see FIGS. 2A and 2B) and the rear power terminal 320 (see FIGS. 3A and 3B). These two parts are respectively set in the charging end assembly 110 and the connecting end assembly 150. When the charging end assembly 110 is removed from the connecting end assembly 150, the part of the power terminal located in the charging end assembly 110 (that is, the front power terminal 220) will be removed together with the charging end assembly 110. When the charging end assembly 110 and the connecting end assembly 150 are assembled in place, the part of the power terminal located in the charging end assembly 110 (that is, the front power terminal 220) is matched with the part of the power terminal located in the connecting end assembly 150 (that is, the rear power terminal 320). See FIGS. 6A-6C (positive terminal 121/negative terminal 122) and FIGS. 7A-7C (ground terminal 125) for the specific structure of the power terminal.

As shown in FIGS. 6A-6C and 7A-7C, the power terminal is roughly cylindrical, including the front power terminal 220 and the rear power terminal 320. The front power terminal 220 and the rear power terminal 320 are detachably connected with each other. Each signal terminal 140 is a single piece, which is set in the charging end assembly 110 and is removed together with the charging end assembly 110 when the charging end assembly 110 is removed from the connecting end assembly 150. Therefore, when the charging end assembly 110 is removed from the connecting end assembly 150, the part of the power terminal (i.e., the front power terminal 220) and the signal terminal 140 located in the charging end assembly 110 can be replaced as required. The specific structure of the signal terminal 140 can be seen in FIG. 8A. The signal terminal 140 is also generally cylindrical.

FIGS. 2A and 2B show the specific structure of the charging end assembly 110, in which FIG. 2A is a perspective view of the charging end assembly 110, and FIG. 2B is an exploded view of the charging end assembly 110. As shown, the charging end assembly 110 comprises a charging end housing 210, which comprises the plurality of mounting posts 212 and a base 211 that connects the plurality of mounting posts 212. A first hole 215 is formed in each mounting post 212. The charging end assembly 110 also comprises a front power terminal 220 and a signal terminal 140 arranged therein. The number of the mounting posts 212 corresponds to the total number of the front power terminals 220 and the signal terminals 140. The front power terminals 220 and the signal terminals 140 are respectively located in the first holes 215 of the mounting posts 212, and can be detachably connected to the inner walls of the first holes 215 through the matched snap structures, as shown in FIGS. 4B and 5B.

FIGS. 3A and 3B show the specific structure of the connecting end assembly 150, wherein FIG. 3A is a perspective view of the connecting end assembly 150, and FIG. 3B is an exploded view of the connecting end assembly 150. The connecting end assembly 150 comprises a connecting end housing 310, and the connecting end housing 310 comprises the plurality of mounting columns 312 and a housing 311. The connecting end housing 310 forms a receptacle 318 for accommodating the charging end assembly 110, and comprises a base 319 for connecting the plurality of mounting columns 312 together. A second hole 315 is formed in each mounting column 312. The number of the second holes 315 of the connecting end assembly 150 is the same as the number of the first holes 215 of the charging end assembly 110, and each second hole 315 is aligned and communicated with a corresponding first hole 215. The connecting end assembly 150 also comprises a rear power terminal 320, which is arranged in a second hole 315. The connecting end assembly 150 also comprises a lead frame 330, which is provided with leads for connecting the signal terminals 140 with the external circuit of the charging base 100. The lead frame 330 is located at the rear end of the connecting end housing 310, that is, the end far from the charging end assembly 110. The rear end of the signal terminal 140 can be connected with the lead frame 330 through a corresponding second hole 315. The specific connection method will be described in detail in combination with FIG. 8A-9B.

Figure 4A:
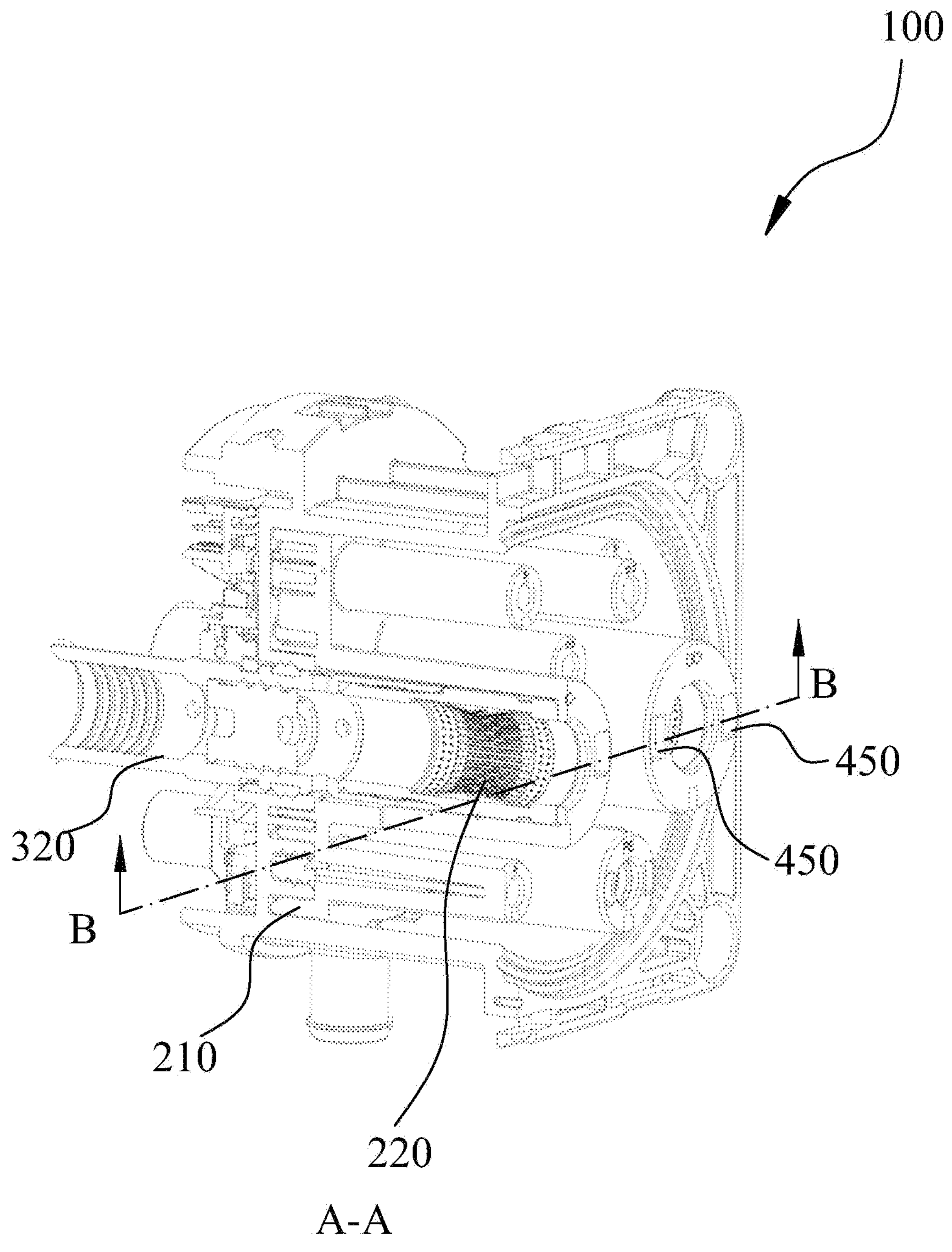
FIG. 4A is a sectional view along line A-A in FIG. 1A.
Figure 4B:
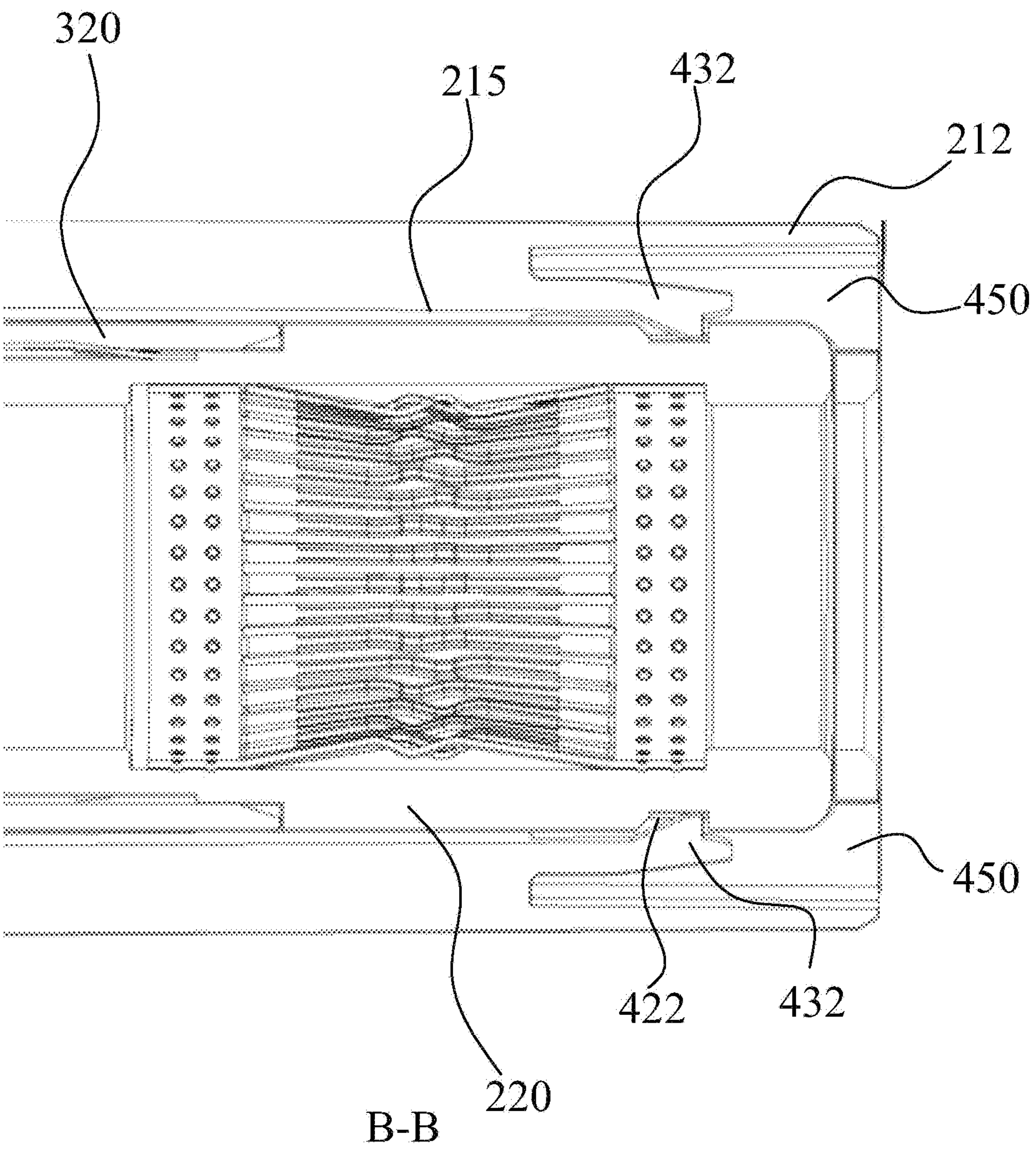
FIG. 4B is a partial sectional view along the B-B line in FIG. 4A, which shows the first snap structure.
Figure 4C:
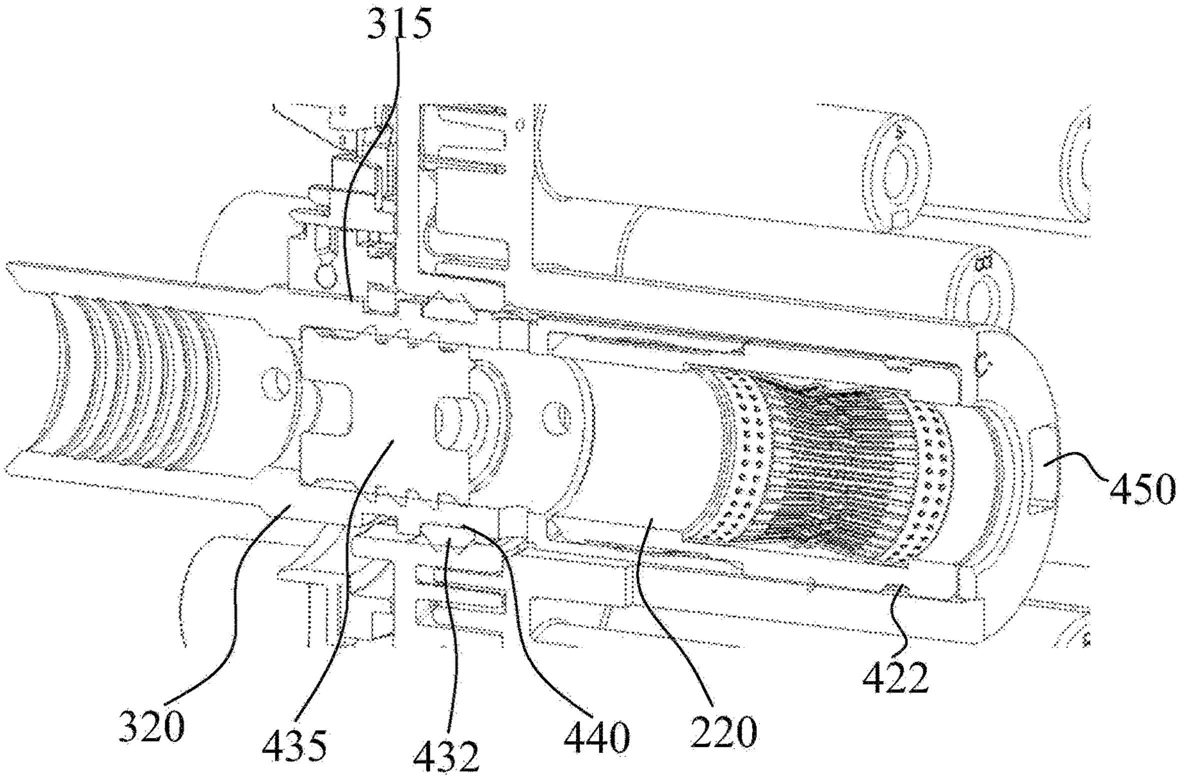
FIG. 4C is a partially enlarged view of FIG. 4A.

FIGS. 4A-4C show the connection structure and sealing structure between the power terminal and the charging end housing 210 and the connecting end housing 310. FIG. 4A is a sectional view along the A-A line in FIG. 1A, FIG. 4B is a partial sectional view along the B-B line in FIG. 4A, and FIG. 4C is a partial enlarged view of FIG. 4A. The front 220 of each power terminal is connected with the corresponding rear power terminal 320, and the rear end of the front power terminal 220 is inserted into the corresponding rear power terminal 320 to realize the connection between them, which is also clearly shown in FIGS. 6A-6C. FIGS. 4A-4C shows the positive terminal 121/negative terminal 122, but it should be noted that this connection structure and sealing structure are also applicable to the ground terminal 125.

The connection structure between the front power terminal 220 and the inner wall of the first hole 215 of the charging end housing 210 (that is, the wall forming the first hole 215 of the mounting post 212) is clearly shown in FIG. 4B. Specifically, the periphery of the front power terminal 220 is provided with a circular concave structure 422 (as shown more clearly in FIGS. 6A-6C), which is formed on the outer surface of the front power terminal 220, and extends around the axis of the power terminal. The annular concave structure 422 is close to the front end of the front power terminal 220 (i.e., the end far from the rear power terminal 320).

The inner wall of the first hole 215 on the charging end housing 210 for receiving the front power terminal 220 is provided with a pair of first buckles or latches 432. The first buckle 432 of the charging end housing 210 and the annular concave structure 422 of the front power terminal 220 form a first snap structure that is mutually matched, which is used to allow the front power terminal 220 to insert into the corresponding first hole 215 from the rear end of the charging end housing 210 (i.e., the end close to the connecting end assembly 150) in the left to right direction as shown in FIGS. 2B and 4B, However, the front power terminal 220 is prevented from exiting from the corresponding first hole 215 in the right to left direction. The first buckle 432 is an elastic cantilever leg, which is connected to the inner wall of the first hole 215 on the charging end housing 210 through the connection end. Its free end can be at least partially clamped into the annular concave structure 422, and the first buckle 432 can deflect around its connection end, so that the first buckle 432 is elastic. When the front power terminal 220 is assembled in place in the first hole 215 of the mounting post 212, the free end of the first buckle 432 is at least partially clamped into the annular concave structure 422. In other embodiments, the number of the first buckles 432 may not be a pair, but only one, which can also realize the connection between the charging end housing 210 and the front power terminal 220. In the embodiment provided with the first buckle 432, this pair of first buckles 432 are symmetrically arranged relative to the front power terminal 220.

Referring to FIG. 4B, the mounting post 212 is provided with a first operation window 450 near the first buckle 432. The operator can insert a tool into the first operation window 450 to operate the first buckle 432, so that the first buckle 432 deflects outward, so that its free end can be moved out of the annular concave structure 422 in the front power terminal 220, thus releasing the front power terminal 220 from the charging end housing 210, so that it can exit from the corresponding first hole 215 in a right to left direction. Thus, the detachable connection between the front power terminal 220 and the charging end housing 210 is realized, which facilitates the replacement of the front power terminal 220 while keeping them in the assembled and in place state. In the embodiments shown in FIGS. 4B and 4C, the first operation window 450 runs through the end of the mounting post 212 and extends to the first buckle 432.

As shown in FIG. 4C, after the front power terminal 220 is connected with the rear power terminal 320, the rear end of the front power terminal 220 is located in the rear power terminal 320. The charging base is provided with a first seal, which is used to seal the power terminal in the second hole 315 in the connecting end housing 310. The first seal comprises a sealing sleeve, which is arranged between the rear power terminal 320 and the second hole 315 on the connecting end housing 310. The sealing sleeve is sleeved on the rear power terminal 320. The sealing sleeve is suitable for being compressed between the outer wall of the rear power terminal 320 and the inner wall of the second hole 315 to seal the gap between them.

Figure 6A:
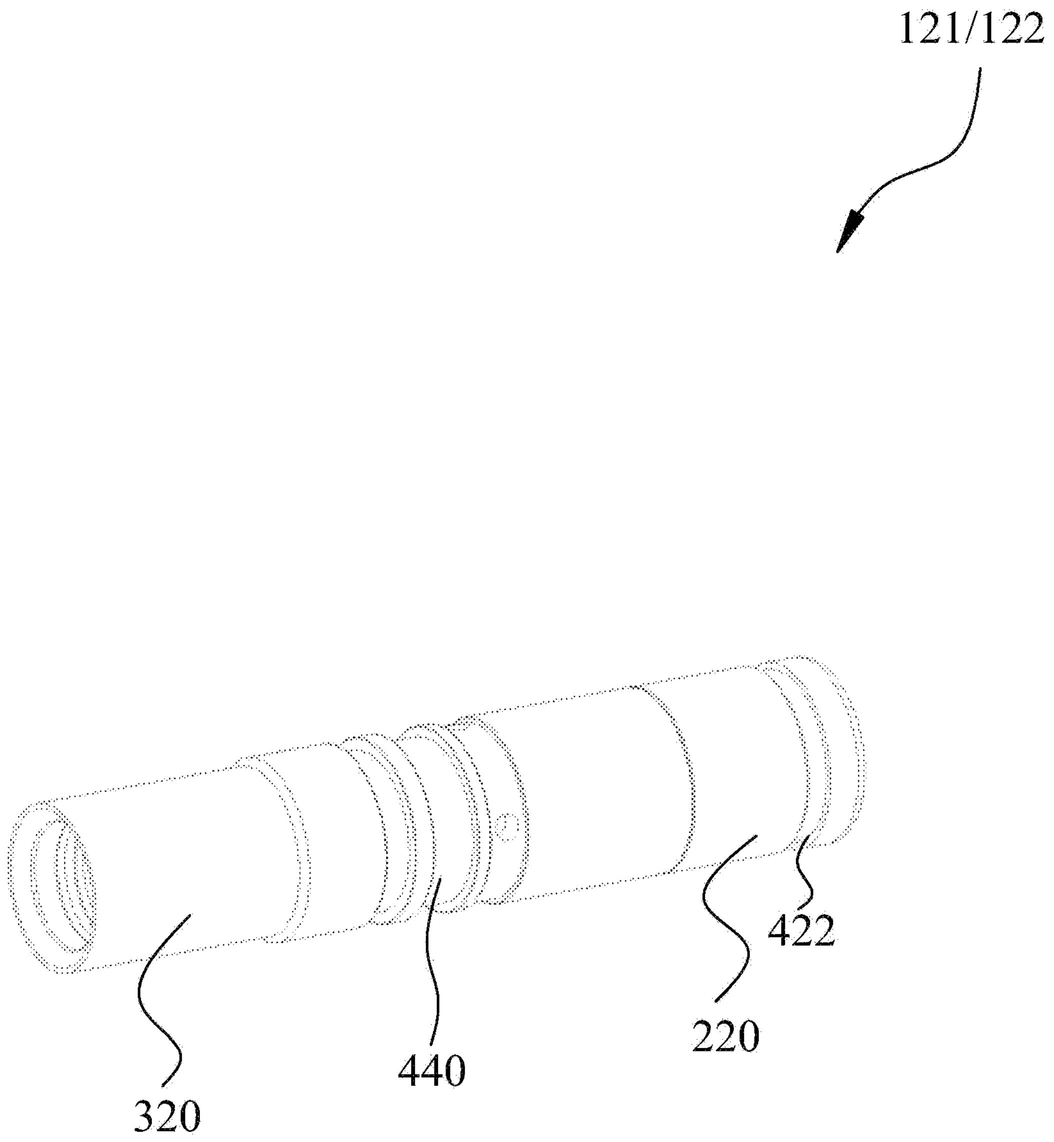
FIG. 6A is a perspective view of the positive/negative terminal in FIG. 1A.
Figure 6B:
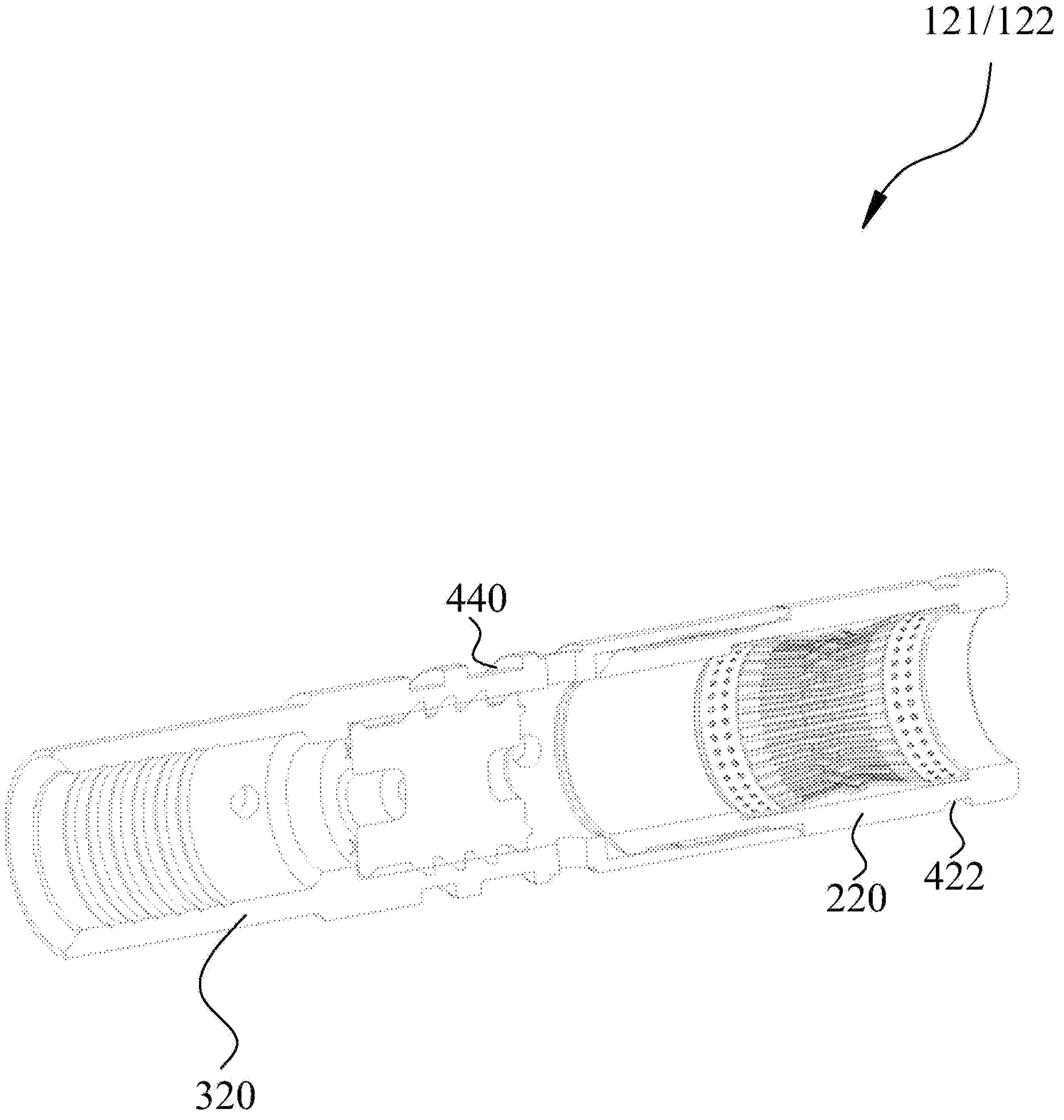
FIG. 6B is a sectional view of the positive/negative terminal in FIG. 6A.
Figure 6C:
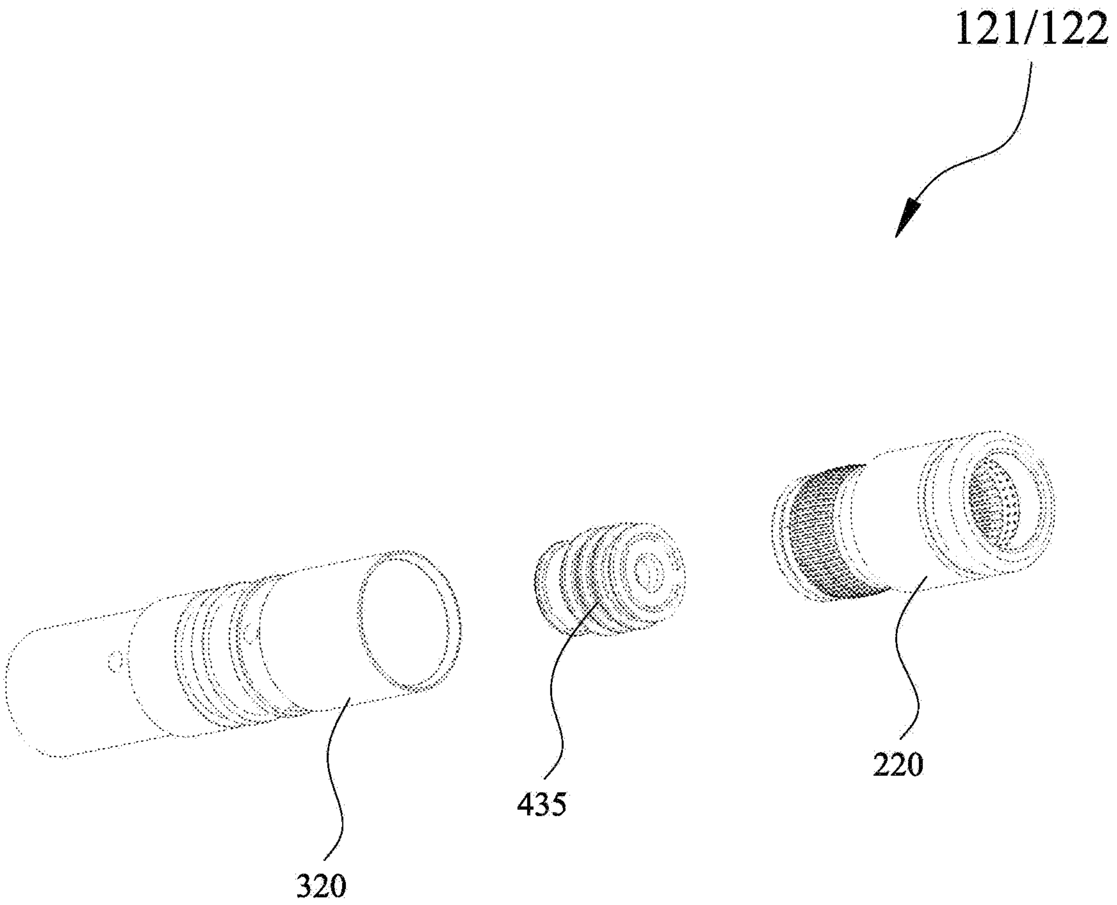
FIG. 6C is an exploded view of the positive/negative terminal in FIG. 6A.

As shown in FIGS. 6A-6C, the outer wall of the rear power terminal 320 is also provided with an annular groove 440, which is used to accommodate at least a part of the sealing sleeve, so as to better maintain the sealing sleeve and be more conducive to achieving the sealing effect. The first seal also comprises a sealing plug 435 arranged in the rear power terminal 320. The sealing plug 435 is inserted into the inner chamber of the rear power terminal 320 to seal the interior of the rear power terminal 320 to prevent water vapor from passing through.

Figure 5A:
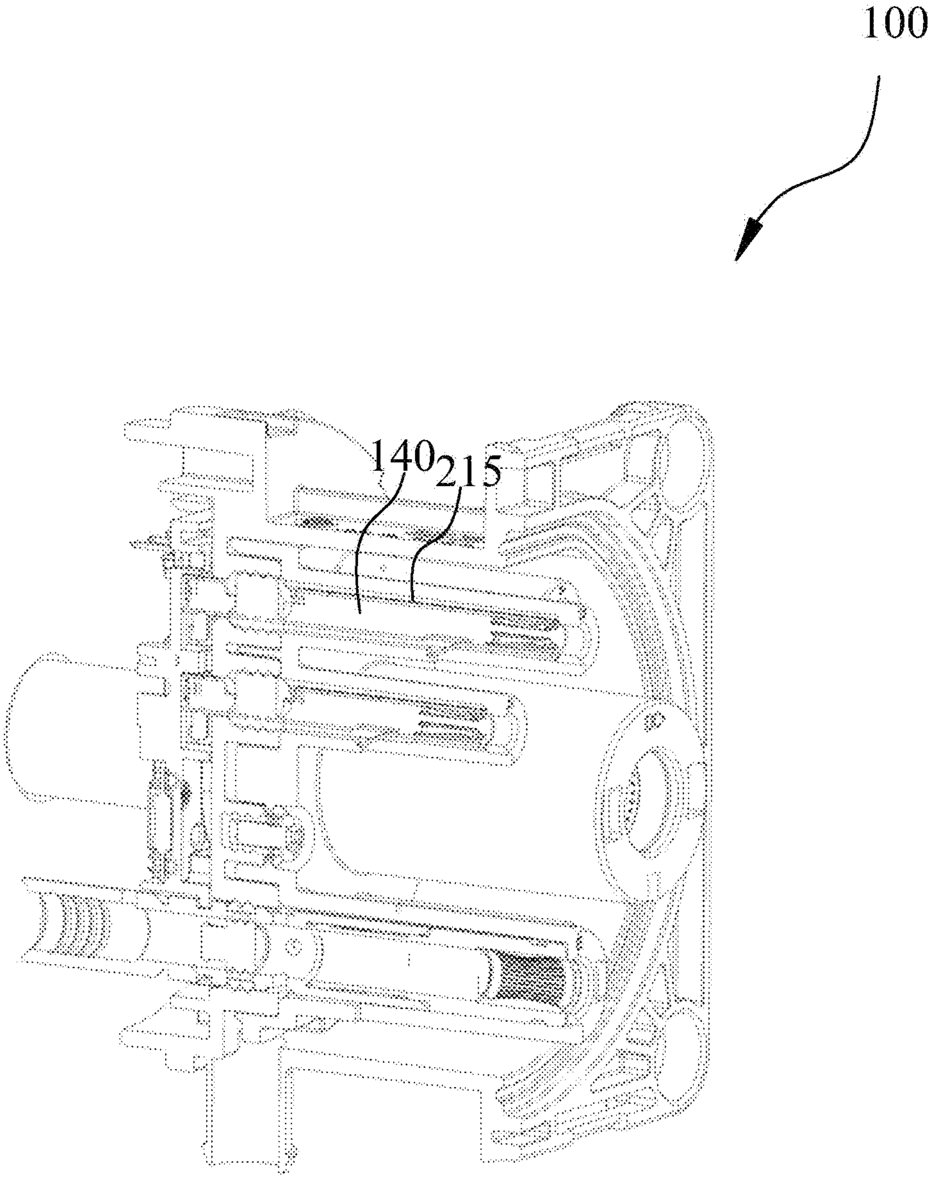
FIG. 5A is a sectional view along the C-C line in FIG. 1A.
Figure 5B:
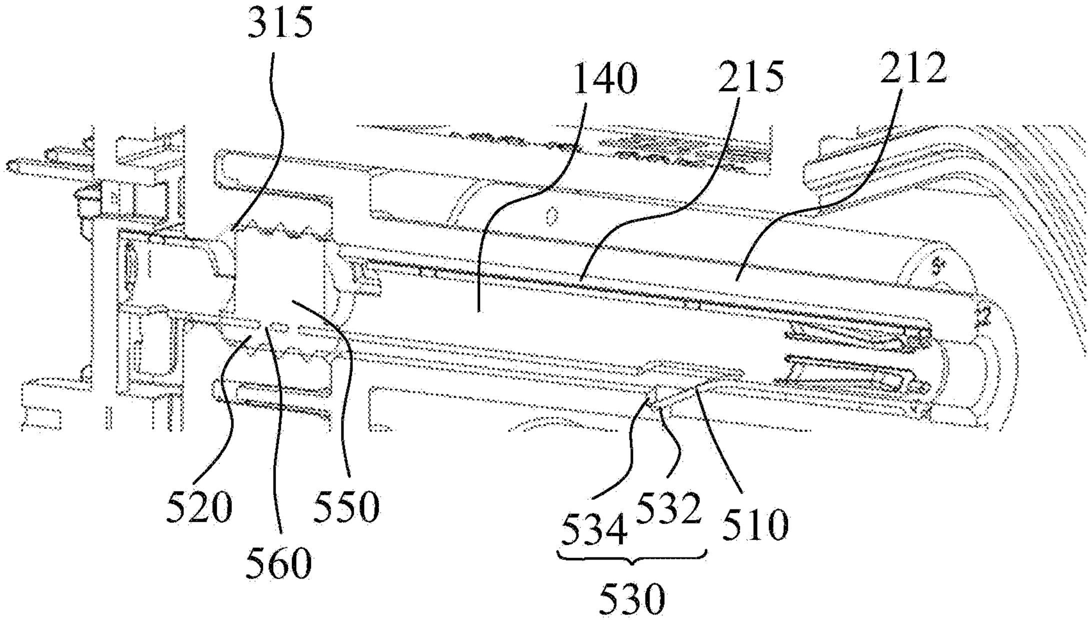
FIG. 5B is a partially enlarged view of FIG. 5A.

FIGS. 5A and 5B show the connection structure and sealing structure between the signal terminal 140 and the charging end housing 210 and the connecting end housing 310. FIG. 5A is a sectional view along the C-C line in FIG. 1A, and FIG. 5B is a partial enlarged view of FIG. 5A. The signal terminal 140 and the first hole 215 of the charging end housing 210 can be detachably connected through the second snap structure. Specifically, the signal terminal 140 is provided with a second buckle 510 protruding from the peripheral surface (as shown more clearly in FIG. 8A), the inner wall of the first hole 215 for receiving the signal terminal 140 is provided with a step 530, and the second buckle 510 forms a second snap structure that is matched with the step 530. It is used to allow the signal terminal 140 to insert into the corresponding first hole 215 from the rear end of the charging end housing 210 (i.e., the end close to the connection end assembly 150) in the left to right direction as shown in FIGS. 2B and 5B, but prevent the signal terminal 140 from exiting from the corresponding first hole 215 in the right to left direction.

The step 530 comprises a radial blocking surface 532 and an axial blocking surface 534. The radial blocking surface 532 intersects the axial blocking surface 534 to form a step shape, and can block the radial outward movement and axial backward movement of the second buckle 510 relative to the first hole 215, respectively. The second buckle 510 can be set against the step 530. More specifically, the second buckle 510 is an elastic cantilever, which is connected to the inner wall of the first hole 215 through the connection end. Its free end can at least partially touch the radial blocking surface 532 and/or the axial blocking surface 534 of the step 530, and the second buckle 510 can deflect around its connection end, so that the second buckle 510 has elasticity. When the signal terminal 140 is assembled in place in the first hole 215 of the mounting post 212, the free end of the second buckle 510 is at least partially against the radial blocking surface 532 and/or the axial blocking surface 534 of the step 530, thereby preventing the signal terminal 140 from exiting from the corresponding first hole 215 in the direction from right to left (that is, from front to back).

The mounting post 212 receiving the signal terminal 140 is provided with a second operation window 540 near the step 530 (clearly shown in combination with FIG. 2A), and the operator can insert a tool into the second operation window 540 to operate the second buckle 510, so as to release the signal terminal 140 from the first hole 215 and enable it to exit from the first hole 215 from right to left. In this way, the detachable connection between the signal terminal 140 and the charging end housing 210 is realized to facilitate the replacement of the signal terminal 140. In the embodiment shown in the figure, the step 530 is at least partially formed by the wall of the second operation window 540. The second operation window 540 runs through the end of the mounting post 212 and extends to the second buckle 510.

As shown in FIGS. 5A and 5B, after the charging end assembly 110 and the connecting end assembly 150 are connected, the signal terminal 140 extends into the corresponding hole 315 of the connecting end assembly 150. The charging base is also provided with a second seal for sealing the signal terminal in the second hole 315 in the connecting end housing 310. The second seal comprises an outer sealing part 520, which is arranged between the signal terminal 140 and the second hole 315 on the connecting end housing 310. The outer sealing part 520 is sleeved on the signal terminal 140. The outer sealing part 520 is suitable for being compressed between the outer wall of the signal terminal 140 and the inner wall of the hole 315 to seal the gap between them. The second seal also comprises an inner sealing part 550, which is inserted into the inner chamber of the signal terminal 140 to seal the interior of the signal terminal 140 to prevent water vapor from passing through. The outer sealing part 520 and the inner sealing part 550 are integrally formed via a plurality of connecting holes 560 arranged on the signal terminal 140.

Due to the frequent plug and pull operations between the charging base 100 and the charging gun during use, the contact parts or surfaces between the power terminal and the signal terminal and the charging gun are subject to wear, which affects the electrical contact therebetween. The described embodiments can easily remedy this problem by providing the detachable charging end assembly 110.

Specifically, the charging base 100 is divided into two detachable parts (i.e., the charging end assembly 110 for matching the charging gun and the connecting end assembly 150 for connecting the cable), and each power terminal is also divided into two detachable parts (i.e., the front power terminal 220 and the rear power terminal 320). The front power terminal 220 and the signal terminal 140 are detachably connected in the charging end housing 210 of the charging end assembly 110 and can be removed from the connecting end assembly 150 together with the charging end housing 210. When one or some parts of the power terminals and signal terminals contacting the charging gun are worn, the charging end assembly 110 can be removed from the connecting end assembly 150 as a whole, and then the worn front power terminals 220 and/or the signal terminals 140 can be removed from the charging end housing 210 for replacement. Embodiments set forth herein not only facilitate the replacement of power terminals, but the signal and ground terminals as well.

Figure 7A:
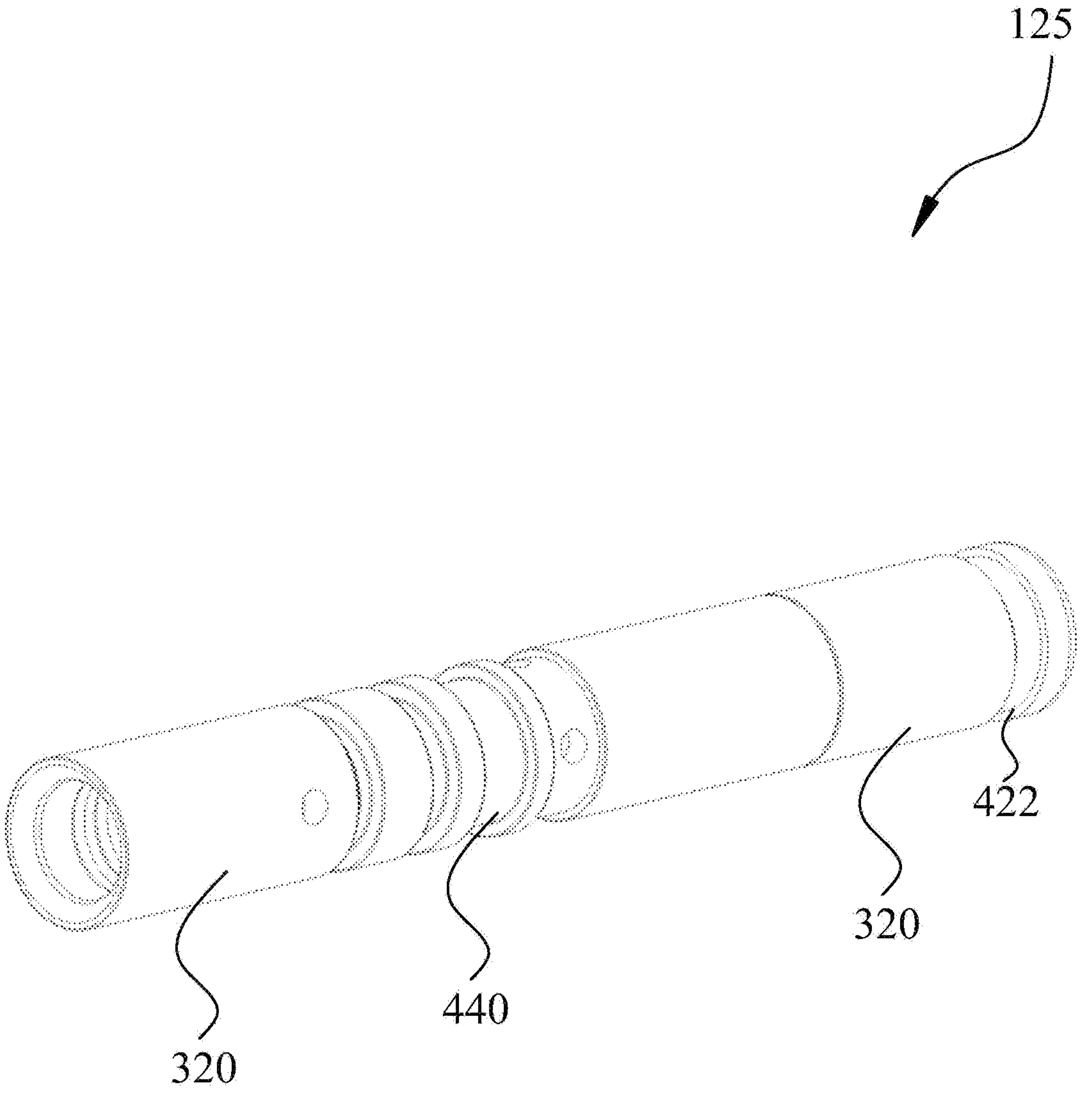
FIG. 7A is a perspective view of the grounding terminal in FIG. 1A.
Figure 7B:
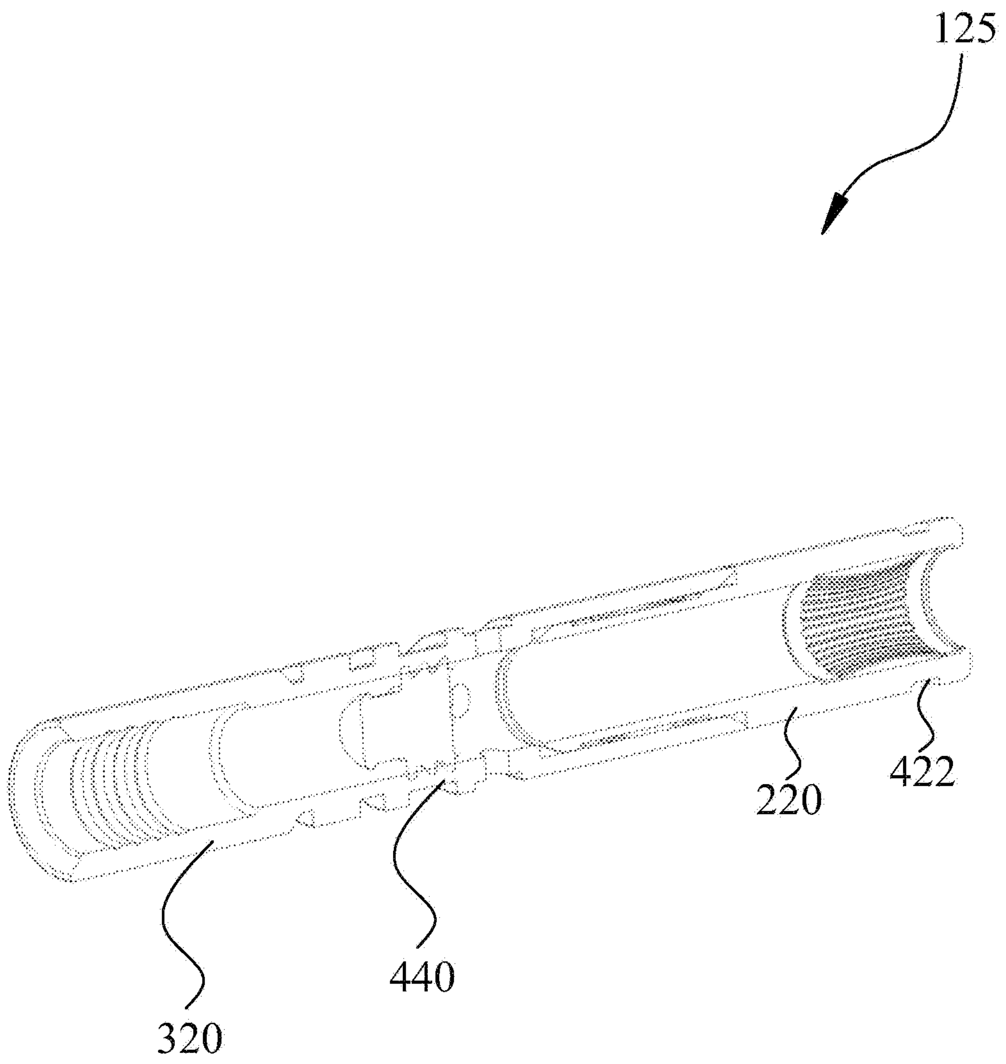
FIG. 7B is a sectional view of the grounding terminal in FIG. 7A.
Figure 7C:
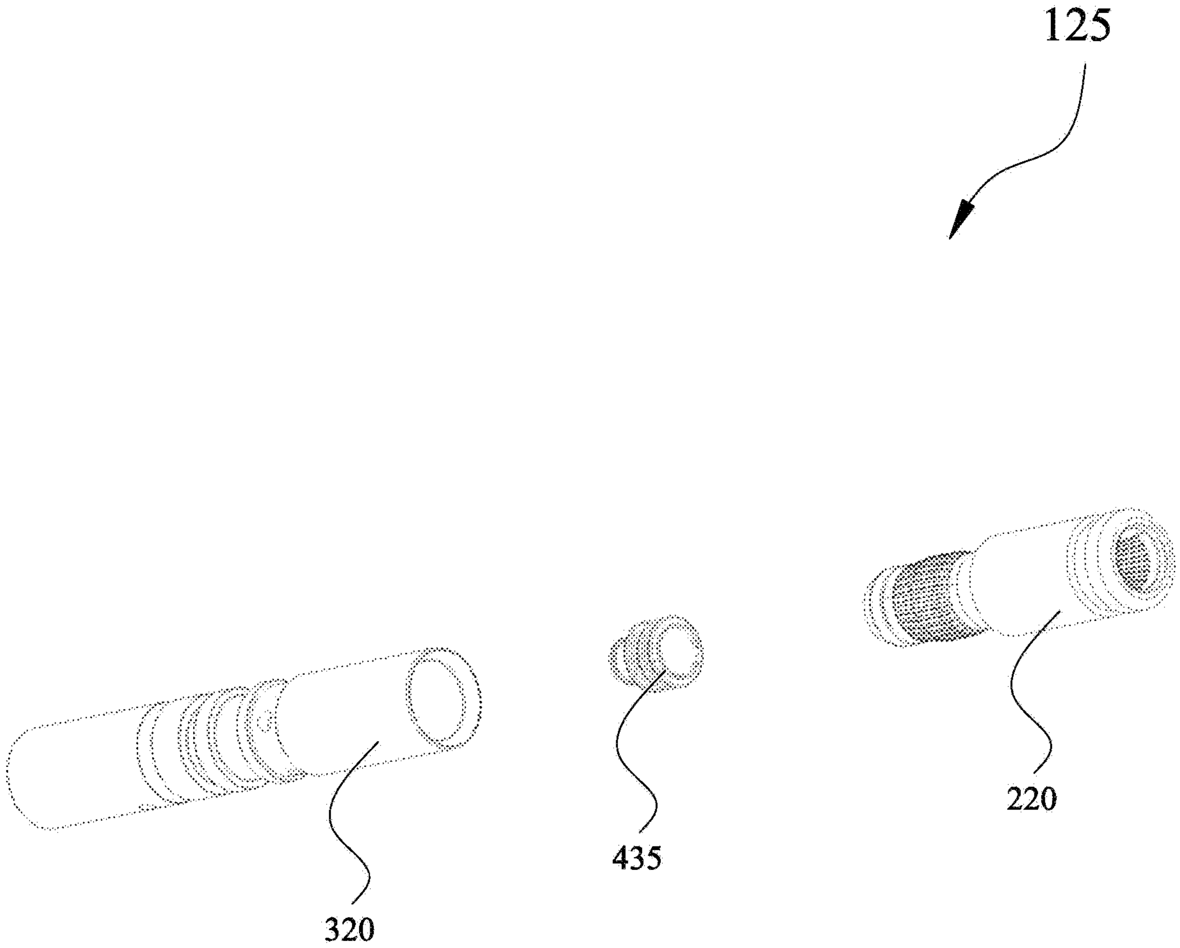
FIG. 7C is an exploded view of the ground terminal in FIG. 7A.
Figure 8A:
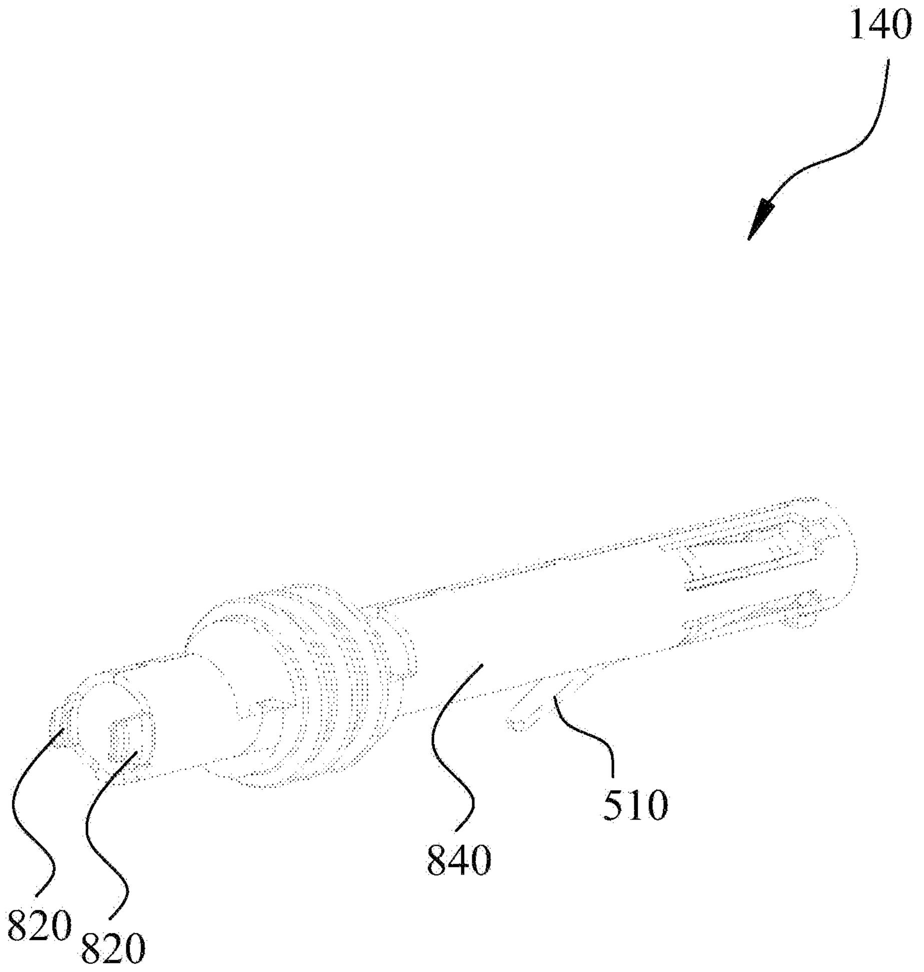
FIG. 8A is a perspective view of the signal terminal in FIG. 1A.

FIGS. 6A-6C show the specific structure of the positive terminal 121/negative terminal 122 in the power terminal. As shown, the two parts of the positive terminal 121/negative terminal 122, namely the front power terminal 220 and the rear power terminal 320, are detachably connected with each other. FIGS. 7A-7C show the specific structure of the grounding terminal 125 in the power terminal. Two parts of the grounding terminal 125, namely the front power terminal 220 and the rear power terminal 320, are detachably connected with each other. FIG. 8A shows the specific structure of the signal terminal 140.

As shown in FIG. 8A, the signal terminal 140 is a stamping integrated part. The signal terminal 140 comprises a main body 840, which is substantially cylindrical. The signal terminal 140 comprises a rear end close to the connecting end assembly 150 and a front end far from the connecting end assembly 150. The rear end of the signal terminal 140 is provided with a pair of guide legs 820, which extend from the end face of the main body 840 and contract inwards radially with respect to the outer wall of the main body 840. The pair of guide legs 820 are arranged radially opposite to each other, thus, the pair of guide legs 820 form an inverted flare shape, and the distance between the ends of the pair of guide legs 820 is less than the diameter (i.e., the outer diameter) of the outer wall of the main body 840 of the signal terminal 140.

Figure 8B:
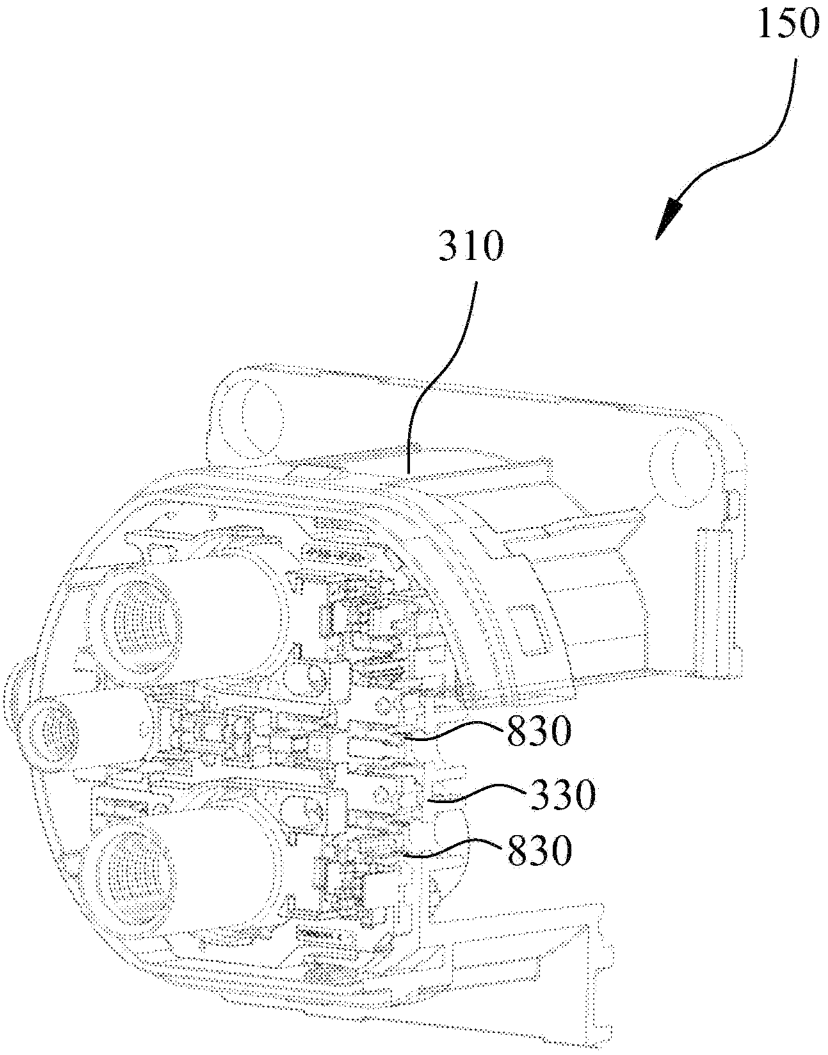
FIG. 8B is a sectional view of FIG. 3A, showing a lead frame.
Figure 8C:
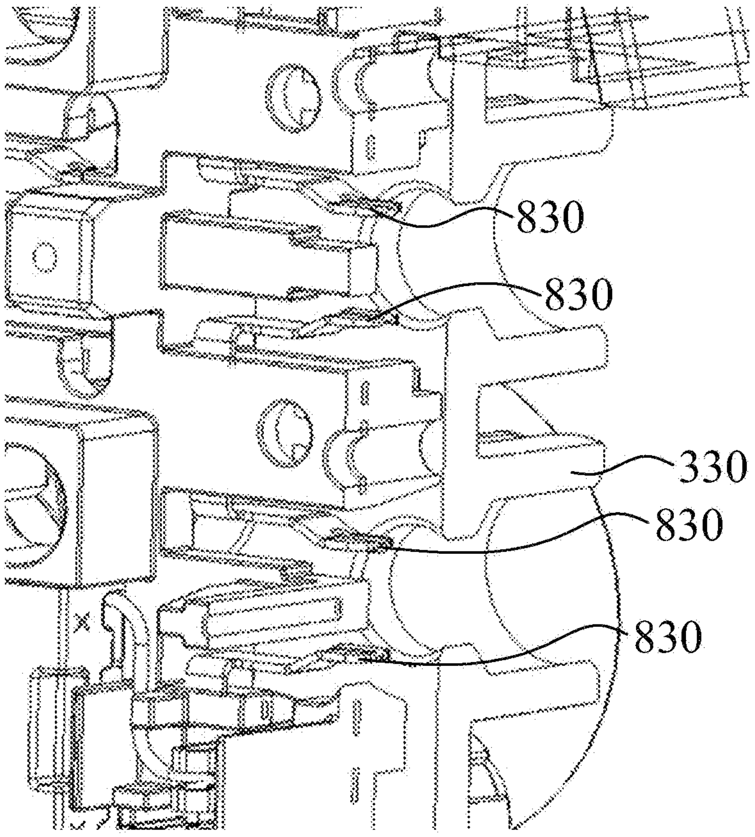
FIG. 8C is a partially enlarged view of FIG. 8B, which shows the spring sheet in the lead frame.

FIG. 8B shows the sectional view of FIG. 3A, which is used to show the connection structure between the lead frame 330 in the connection end assembly 150 and the signal terminal 140. FIG. 8C is a partially enlarged view of FIG. 8B. As shown in FIGS. 8B and 8C, the lead frame 330 is provided with pairs of spring sheets 830 corresponding to the number of signal terminals 140, and each signal terminal 140 corresponds to a pair of spring sheets 830. The signal terminal 140 is connected with the lead frame 330 by inserting the outer wall of the main body 840 between a pair of spring sheets 830. The distance between the inner surfaces of a pair of spring sheets 830 is slightly less than the diameter (i.e., the radial outward dimension) of the outer wall of the signal terminal 140, such that the spring sheets 830 are clamped on the outer wall of the signal terminal 140 with a certain elastic force.

The pair of guide legs 820 of the signal terminal 140 is used to offset the pair of spring sheets 830 corresponding to the signal terminal 140, so that the pair of spring sheets 830 are offset in the direction away from each other. Therefore, the outer wall of the main body 840 of the signal terminal is guided and inserted between the pair of spring sheets 830, realizing the connection between the signal terminal 140 and the lead frame 330.

Figure 9A:
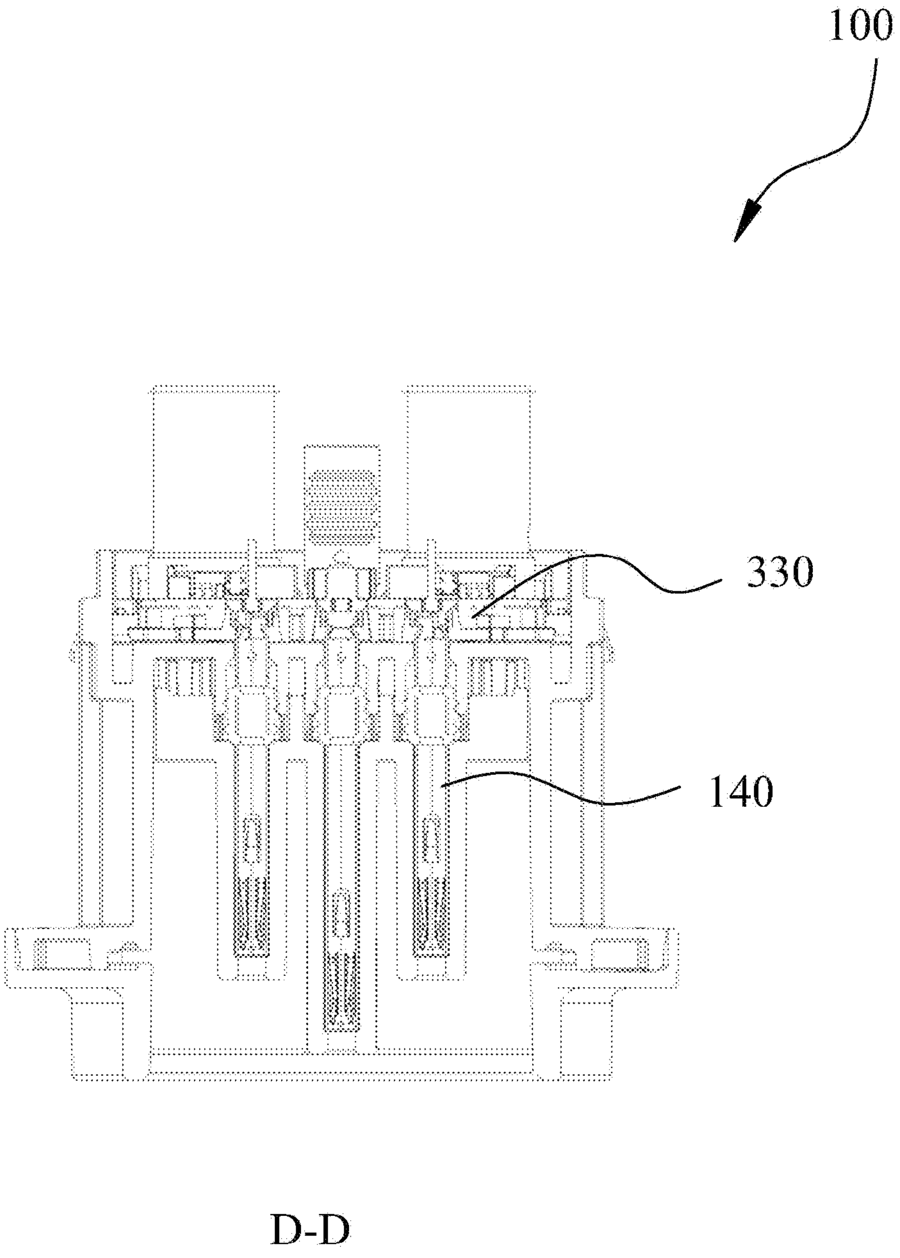
FIG. 9A is a sectional view along the D-D line direction in FIG. 1A when the charging end assembly and the connecting end assembly are not yet assembled.
Figure 9B:
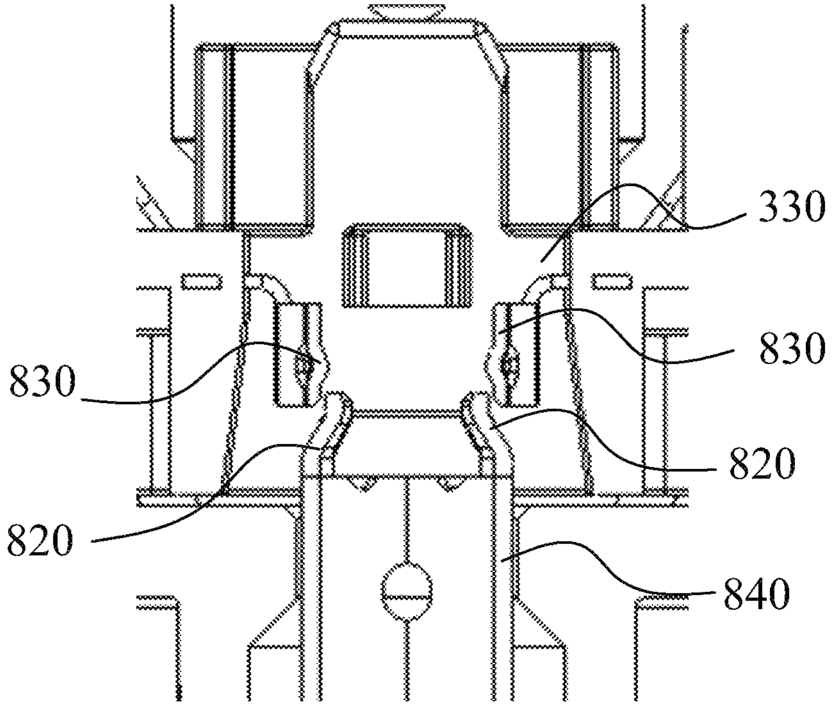
FIG. 9B is a partial enlarged view of FIG. 9A, which shows the position relationship between the guide leg of the signal terminal and the spring sheet in the lead frame.
Figure 10A:
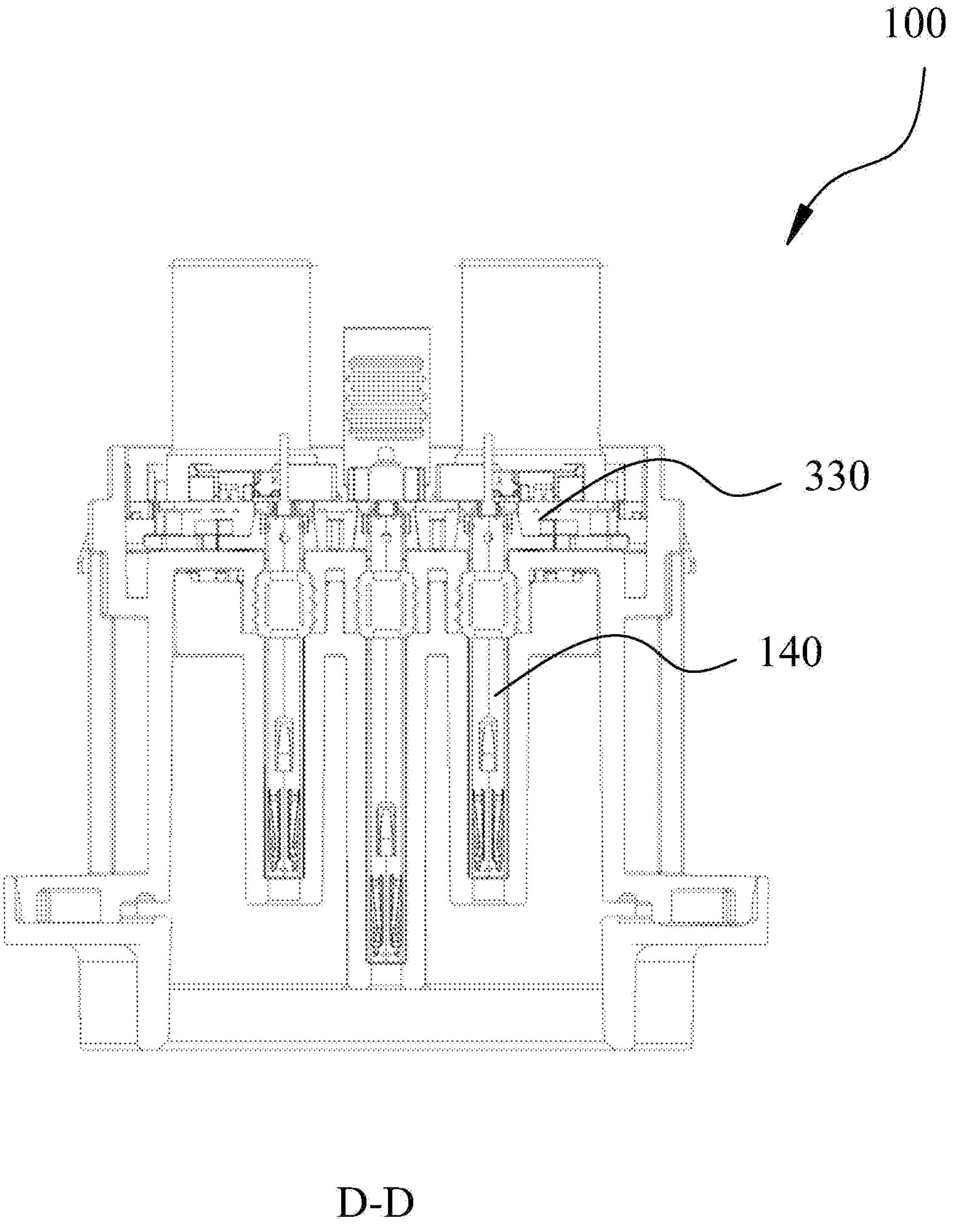
FIG. 10A is a sectional view along the D-D direction of FIG. 1A when the charging end assembly and the connecting end assembly are assembled.
Figure 10B:
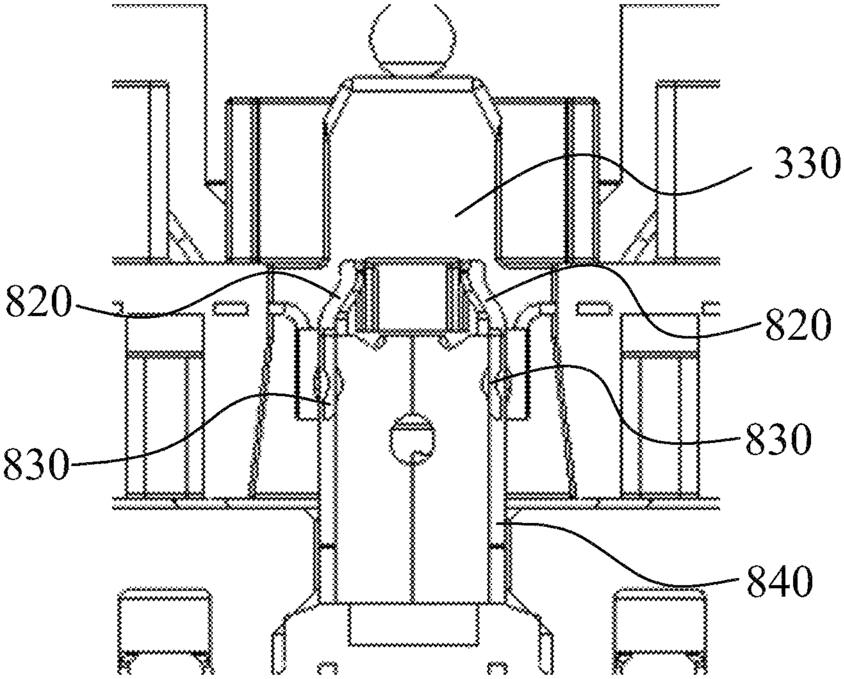
FIG. 10B is a partial enlarged view of FIG. 10A, which shows the position relationship between the guide leg of the signal terminal and the spring sheet in the lead frame.

FIGS. 9A and 9B show the positional relationship between the signal terminal 140 in the charging end assembly 110 and a pair of spring sheets 830 of the lead frame 330 when the signal terminal 140 in the charging end assembly 110 has not been fully inserted into the corresponding hole 315 in the connecting end assembly 150. FIG. 9A is a sectional view along the D-D direction in FIG. 1A when the charging end assembly and the connecting end assembly have not been assembled, and FIG. 9B is a partial enlarged view of FIG. 9A. FIGS. 10A and 10B show the positional relationship between the signal terminal 140 in the charging end assembly 110 and a pair of spring sheets 830 in the lead frame 330 when the signal terminal 140 in the charging end assembly 110 is fully inserted into the corresponding second hole 315 in the connection end assembly 150. Wherein, FIG. 10A is a sectional view of the D-D line in FIG. 1A, and FIG. 10B is a partial enlarged view of FIG. 10A.

As shown in FIGS. 9A and 9B, a pair of spring sheets 830 is in the position before assembly, where "assembly" refers to the integration of charging end assembly 110 and connecting end assembly 150. When the charging end assembly 110 is inserted into the connecting end assembly 150, a pair of guide legs 820 of the signal terminal 140 will be gradually inserted between a pair of spring sheets 830 at the position before assembly, and gradually stretch the pair of spring sheets 830 relative to each other until the outer wall of the main body 840 of the signal terminal 140 enters between the pair of spring sheets 830 (as shown in FIGS. 10A and 10B). When the charging end assembly 110 and the connecting end assembly 150 are assembled in place, the pair of spring sheets 830 is elastically clamped on the outer wall of the main body 840 of the signal terminal 140 to reach the position after assembly to realize the connection between the signal terminal 140 and the lead frame 330.

It should be noted that although the embodiment in the figure shows a pair of guide legs 820, only one guide leg 820 is set on the signal terminal 140, which can also guide the outer wall of the main body 840 of the signal terminal 140 to enter between the pair of spring sheets 830, which is also within the scope of the present disclosure.

For the charging base with the detachable charging end assembly 110 according to the present invention, a guide leg 820 which is radially retracted relative to the outer wall of the main body 840 of the signal terminal 140 is arranged on the signal terminal 140. When the signal terminal 140 of the charging end assembly 110 is inserted into the main body 810 of the corresponding second hole 315 on the connecting end assembly 150, it can prevent the undesired thrust from being applied to the pair of spring sheets 830 at the pre assembly position of the lead frame 330 of the connecting end assembly 150, thus ensuring that the spring sheets 830 reach the expected post assembly position, so as to ensure a good electrical connection between the spring sheets 830 and the signal terminal 140. This is particularly beneficial for a charging base that requires the replacement of signal terminals frequently due to repeated plugging and unplugging.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A charging base, comprising:

a charging end assembly including a charging end housing and a plurality of front power terminals, the charging end housing defining a plurality of first holes with each of the front power terminals fixedly arranged in one of the plurality of first holes, at least one of the front power terminals is connected with the corresponding first hole via a first snap structure, the first snap structure includes a first latch, the charging end housing defines a first operation window exposing the first latch therethrough and enabling the release of the front power terminal from the charging end housing; and a connecting end assembly detachably connected to the charging end assembly and including a connecting end housing and a plurality of rear power terminals, the connecting end housing defining a plurality of second holes with each of the rear power terminals arranged in one of the plurality of second holes, wherein:

with the charging end assembly connected to the connecting end assembly, the second holes aligning and communicating with the first holes, and the rear power terminals connecting to the front power terminals; and with the charging end assembly removed from the connecting end assembly, the front power terminals remaining in the charging end housing and the rear power terminals remaining in the connecting end housing.

2. The charging base according to claim 1, wherein the first snap structure includes:

a concave structure formed around the front power terminal; and the first latch which is arranged on a wall of the first hole in the charging end housing, the first latch snapping in the concave structure to secure the front power terminal in the charging end housing.

3. The charging base according to claim 2, wherein the first snap structure includes a pair of the first latches which are symmetrically arranged relative to the front power terminal.

4. The charging base according to claim 2, wherein the charging end assembly further includes a plurality of signal terminals fixedly arranged in respective ones of the plurality of first holes.

5. The charging base according to claim 4, wherein:

with the charging end assembly connected to the connecting end assembly, the signal terminals are inserted into the corresponding second holes; and with the charging end assembly removed from the connecting end assembly, the signal terminals remain in the charging end housing and are separated from the connecting end assembly together with the charging end housing.

6. The charging base according to claim 5, wherein each of the signal terminals is connected with the corresponding first hole through a second snap structure.

7. The charging base according to claim 6, wherein the second snap structure includes:

a step arranged on a hole wall of the first hole in the charging end housing; and a second latch protruding from a surface of the signal terminal and abutting the step to retain the signal terminal in the charging end housing.

8. The charging base according to claim 7, wherein the signal terminal is a stamped, integrated part.

9. The charging base according to claim 7, wherein the charging end housing defines a second operation window exposing the second latch therethrough and enabling the release the signal terminal from the charging end housing.

10. The charging base according to claim 4, further comprising a plurality of seals sealing respective ones of the plurality of signal terminals in the second holes in the connecting end housing.

11. The charging base according to claim 10, wherein the seal is an integral component defining:

an outer sealing part sealing a gap between the signal terminal and the second hole of the connecting end housing; and an inner sealing part sealing an inner chamber of the signal terminal.

12. The charging base according to claim 1, wherein each of the plurality of front power terminals is detachably fixed in one of the plurality of first holes.

13. The charging base according to claim 1, wherein the charging end assembly and the connecting end assembly are fixedly connected via a plurality of bolts.

14. The charging base according to claim 1, further comprising a plurality of seals sealing respective power terminals in the second holes in the connecting end housing.

15. The charging base according to claim 14, wherein the seals include a plurality of sealing sleeves sealing gaps between rear ends of the power terminals and the second holes in the connecting end housing.

16. The charging base according to claim 15, wherein the seals further include a plurality of sealing plugs sealing rear inner chambers of the plurality of rear power terminals.

17. A charging base, comprising:

a charging end assembly, including:

a charging end housing defining a plurality of first openings; and a plurality of front terminals detachably fixed in respective ones of the first openings; and a connecting end assembly detachably connected to the charging end assembly, including:

a connecting end housing defining a plurality of second openings; and a plurality of rear terminals detachably fixed in respective ones of one of the plurality of second openings, the front and rear terminals detachably electrically connected to one another with the connecting end assembly connected to the charging end assembly.

18. The charging base according to claim 17, wherein each of the plurality of front and rear terminals is detachably fixed in respective first and second openings via a latch.

* * * * *